US009529234B2

(12) United States Patent
Kim et al.

(10) Patent No.: US 9,529,234 B2
(45) Date of Patent: Dec. 27, 2016

(54) LIQUID CRYSTAL DISPLAY

(71) Applicant: Samsung Display Co., Ltd., Yongin-City, Gyeonggi-Do (KR)

(72) Inventors: Hyo Sik Kim, Yongin-si (KR); Dan Bi Yang, Gunpo-si (KR); Min Joo Han, Seoul (KR)

(73) Assignee: Samsung Display Co., Ltd. (KR)

( * ) Notice: Subject to any disclaimer, the term of this patent is extended or adjusted under 35 U.S.C. 154(b) by 102 days.

(21) Appl. No.: 14/662,565

(22) Filed: Mar. 19, 2015

(65) Prior Publication Data

US 2016/0139467 A1 May 19, 2016

(30) Foreign Application Priority Data

Nov. 14, 2014 (KR) ........................ 10-2014-0158847

(51) Int. Cl.
*G02F 1/1343* (2006.01)
*G02F 1/1362* (2006.01)
*G02F 1/1337* (2006.01)

(52) U.S. Cl.
CPC ..... *G02F 1/134309* (2013.01); *G02F 1/13624* (2013.01); *G02F 2001/133776* (2013.01)

(58) Field of Classification Search
CPC .............. G02F 2001/134345; G02F 1/134336; G02F 1/134327; G02F 1/134309; G02F 1/13345

USPC ......................................... 349/138, 139, 144
See application file for complete search history.

(56) References Cited

U.S. PATENT DOCUMENTS

2013/0002625 A1*  1/2013  Liao .................. G02F 1/134309
                                                            345/205

FOREIGN PATENT DOCUMENTS

| KR | 1020050112630 A | 12/2005 |
| KR | 1020140021749 A | 2/2014 |
| KR | 1020140097905 A | 8/2014 |

* cited by examiner

*Primary Examiner* — Thanh-Nhan P Nguyen
(74) *Attorney, Agent, or Firm* — Innovation Counsel LLP

(57) ABSTRACT

Provided is a liquid crystal display including: a first substrate; a first subpixel electrode which is positioned on the first substrate, to which a first voltage is configured to be applied, and which includes first and second subregions; a second subpixel electrode which is positioned on the first substrate, to which a second voltage is configured to be applied, and which includes a third, fourth, and fifth subregions; an insulating layer which is positioned on the first subregion and the third subregion and positioned below the second subregion and the fourth and fifth subregions; a second substrate facing the first substrate; a common electrode which is positioned on the second substrate and to which a common voltage is configured to be applied; and a liquid crystal layer positioned between the first substrate and the second substrate, in which the first subregion and the fourth subregion overlap with each other.

20 Claims, 13 Drawing Sheets

197b4

LIQUID CRYSTAL DISPLAY

CROSS-REFERENCE TO RELATED APPLICATION

This application claims priority to and the benefit of Korean Patent Application No. 10-2014-0158847 filed in the Korean Intellectual Property Office on Nov. 14, 2014, the entire contents of which are incorporated herein by reference.

BACKGROUND (a) Technical Field

The present application relates to a liquid crystal display.

(b) Description of the Related Art

A liquid crystal display which is one of the most common types of flat panel displays currently in use, includes two display panels with field generating electrodes such as a pixel electrode, a common electrode, and the like and a liquid crystal layer interposed therebetween.

The liquid crystal display generates an electric field in the liquid crystal layer by applying voltage to the field generating electrodes, and determines the alignment of liquid crystal molecules of the liquid crystal layer by the generated electric field, thus controlling polarization of incident light so as to display images.

The liquid crystal display includes a switching element connected to each pixel electrode, and a plurality of signal lines such as a gate line and a data line for applying voltages to the pixel electrode by controlling the switching element.

Among the liquid crystal displays, a vertically aligned mode liquid crystal display, in which liquid crystal molecules are aligned so that long axes thereof are vertical to display panels while the electric field is not applied, has been in the limelight due to a large contrast ratio and a wide reference viewing angle. Here, the reference viewing angle means a viewing angle having a contrast ratio of 1:10 or a luminance reversion limit angle between grays.

In the case of the vertically aligned mode liquid crystal display, in order to approximate side visibility to front visibility, a method of varying transmittance by dividing one pixel into two subpixels and applying different voltages of the two subpixels is proposed.

However, as such, in the case of approximating the side visibility to the front visibility by dividing one pixel into two subpixels and varying the transmittance, luminance is increased at a low gray or a high gray and thus a gray expression at the side is difficult, and as a result, there is a problem in that image quality deteriorates.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display having features of approximating side visibility to front visibility and implementing an accurate color at the side.

An exemplary embodiment provides a liquid crystal display including: a first substrate; a first subpixel electrode which is positioned on the first substrate, to which a first voltage is configured to be applied, and which includes a first subregion and a second subregion; a second subpixel electrode which is positioned on the first substrate, to which a second voltage is configured to be applied, and which includes a third subregion, a fourth subregion, and a fifth subregion; an insulating layer which is positioned on the first subregion of the first subpixel electrode and the third subregion of the second subpixel electrode and positioned below the second subregion of the first subpixel electrode and the fourth subregion and the fifth subregion of the second subpixel electrode; a second substrate facing the first substrate; a common electrode which is positioned on the second substrate and to which a common voltage is configured to be applied; and a liquid crystal layer positioned between the first substrate and the second substrate, in which the first subregion of the first subpixel electrode and the fourth subregion of the second subpixel electrode overlap with each other.

A difference between the first voltage and the common voltage may be larger than a difference between the second voltage and the common voltage.

The liquid crystal display may further include a plurality of pixels, in which the pixels may include a first region in which the second subregion of the first subpixel electrode is positioned, a second region in which the first subregion of the first subpixel electrode and the fourth subregion of the second subpixel electrode overlap with each other, a third region in which the fifth subregion of the second subpixel electrode is positioned, and a fourth region in which the third subregion of the second subpixel electrode is positioned.

Luminance of the first region, the second region, the third region, and the fourth region may be different.

The luminance of the second region may be lower than the luminance of the first region, the luminance of the third region may be lower than the luminance of the second region, and the luminance of the fourth region may be lower than the luminance of the third region.

A first contact hole extending to at least a part of the first subregion of the first subpixel electrode may be formed in the insulating layer, and the second subregion of the first subpixel electrode may be connected with the first subregion of the first subpixel electrode through the first contact hole.

A second contact hole extending to at least a part of the third subregion of the second subpixel electrode may be formed in the insulating layer, and the fourth subregion of the second subpixel electrode may be connected with the third subregion of the first subpixel electrode through the second contact hole.

The third subregion of the second subpixel electrode may include a plurality of first branch electrodes extending in two different directions and a first outer electrode connecting edges of the plurality of first branch electrodes.

The second subregion of the first subpixel electrode may include a cross stem and a plurality of second branch electrodes extending from the cross stem in four different directions.

The fourth subregion of the second subpixel electrode may include a plurality of third branch electrodes extending in two different directions and a second outer electrode connecting edges of the plurality of third branch electrodes.

Some of the third branch electrodes may be extended in the fifth subregion of the second subpixel electrode.

The second outer electrode of the fourth subregion of the second subpixel electrode may be extended to overlap with the first outer electrode.

The second outer electrode and the first outer electrode may be connected to each other.

The first subregion of the first subpixel electrode may have a planar shape.

The first subregion of the first subpixel electrode and the fourth subregion of the second subpixel electrode may be positioned to surround the second subregion of the first subpixel electrode, and the third and fifth subregions of the second subpixel electrode may be positioned to surround the fourth subregion of the second subpixel electrode.

The first subpixel electrode and the second subpixel electrode may be physically and electrically separated from each other.

The first subregion of the first subpixel electrode may be positioned on the same layer as the third subregion of the second subpixel electrode and physically and electrically separated from the third subregion of the second subpixel electrode.

The second subregion of the first subpixel electrode may be positioned on the same layer as the fourth subregion and the fifth subregion of the second subpixel electrode and physically and electrically separated from the fourth subregion and the fifth subregion of the second subpixel electrode.

The liquid crystal display may further include a plurality of pixels, in which the pixels may include a first region in which the second subregion of the first subpixel electrode is positioned, a second region in which the first subregion of the first subpixel electrode and the fourth subregion of the second subpixel electrode overlap with each other, a third region in which the fifth subregion of the second subpixel electrode is positioned, and a fourth region in which the third subregion of the second subpixel electrode is positioned.

The luminance of the second region may be lower than the luminance of the first region, the luminance of the third region may be lower than the luminance of the second region, and the luminance of the fourth region may be lower than the luminance of the third region.

According to the exemplary embodiment, it is possible to approximate side visibility to front visibility and implement an accurate color at the side.

DETAILED DESCRIPTION OF THE EMBODIMENTS

Figure 1:
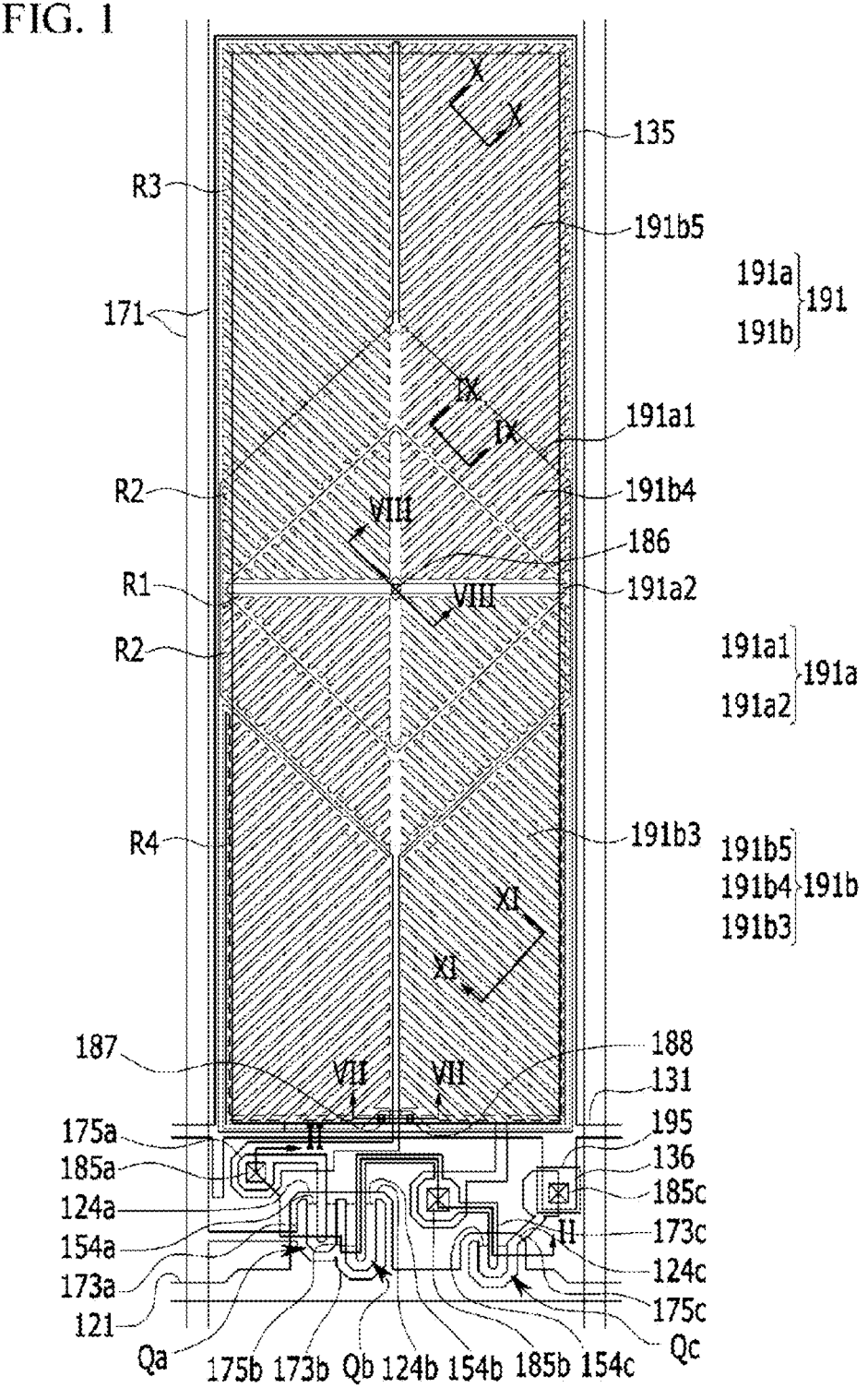
FIG. 1 is a layout view of a liquid crystal display according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Next, a liquid crystal display according to an exemplary embodiment will be described with reference to FIGS. 1 to 11.

Figure 2:
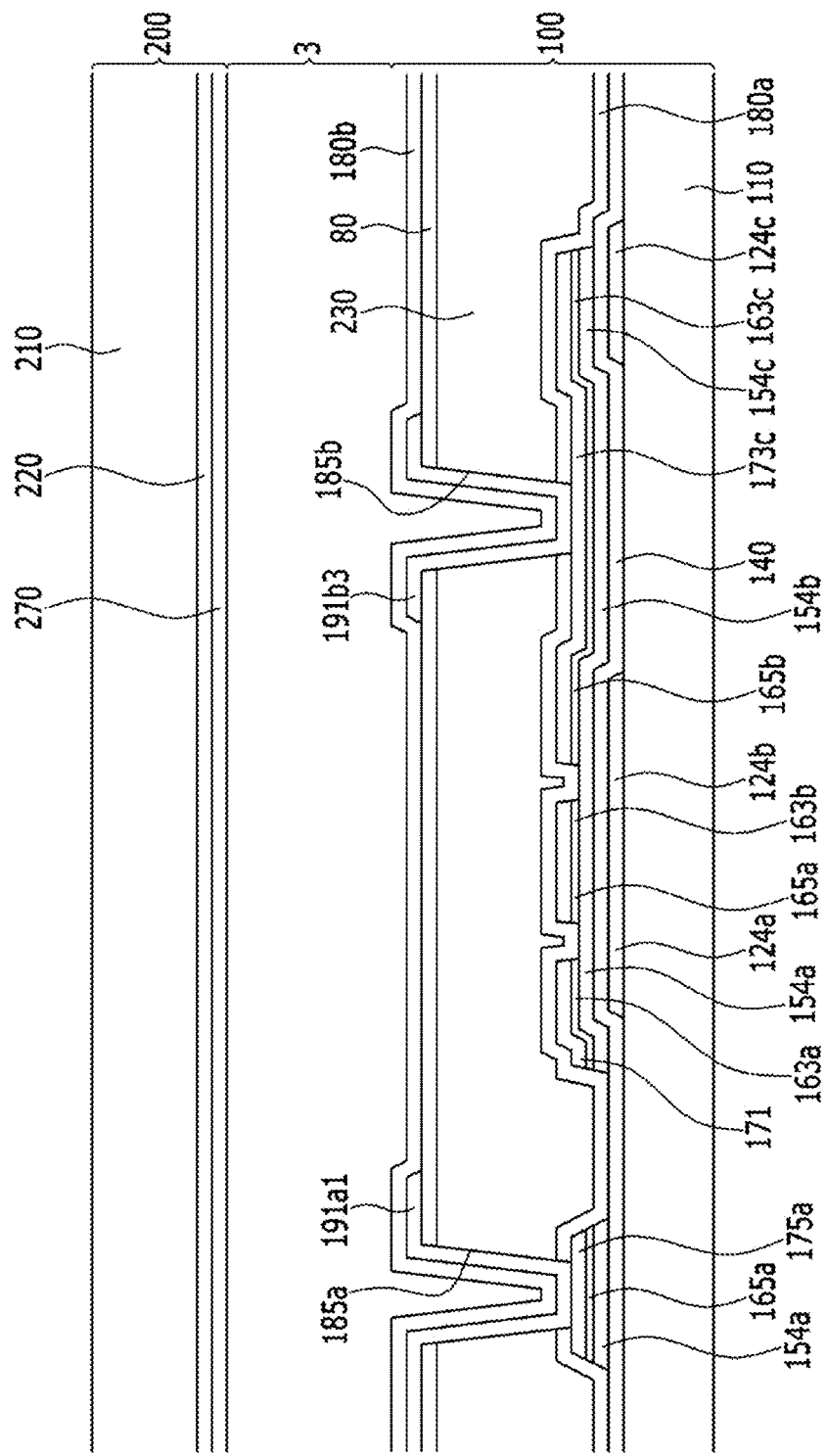
FIG. 2 is a cross-sectional view of the liquid crystal display of FIG. 1 taken along line II-II.
Figure 3:
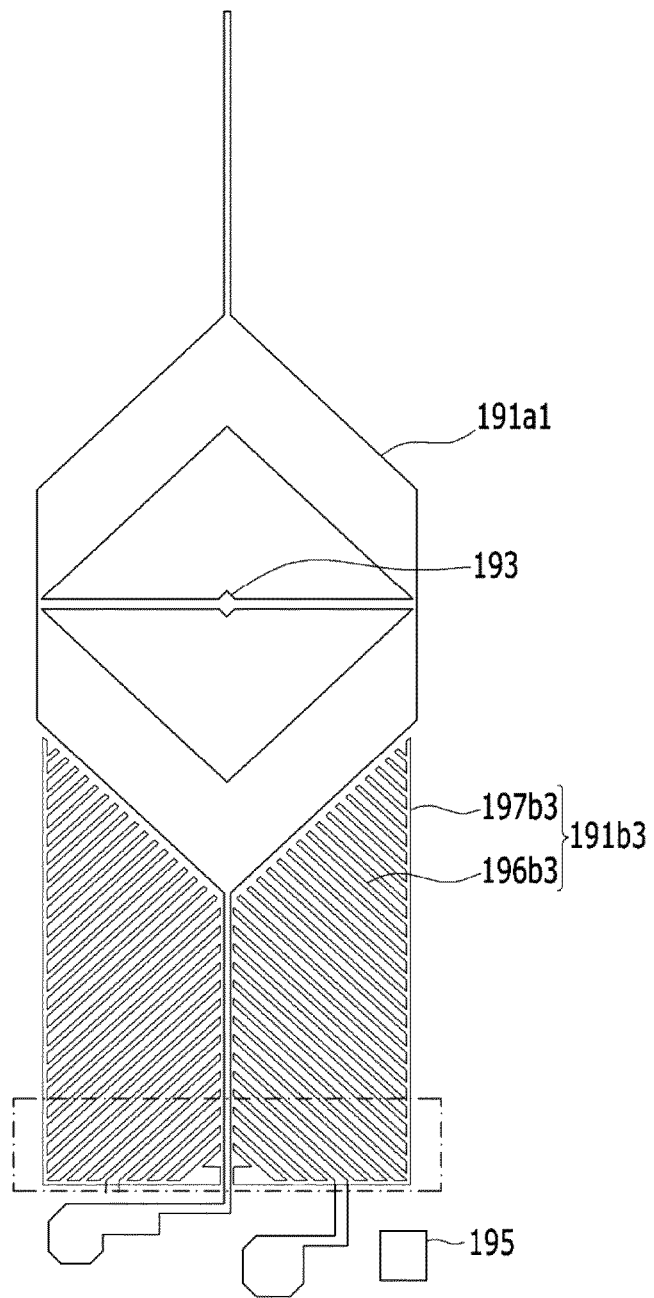
FIG. 3 is a layout view of a part of a first subpixel electrode and a part of a second subpixel electrode of the liquid crystal display of FIG. 1.
Figure 4:
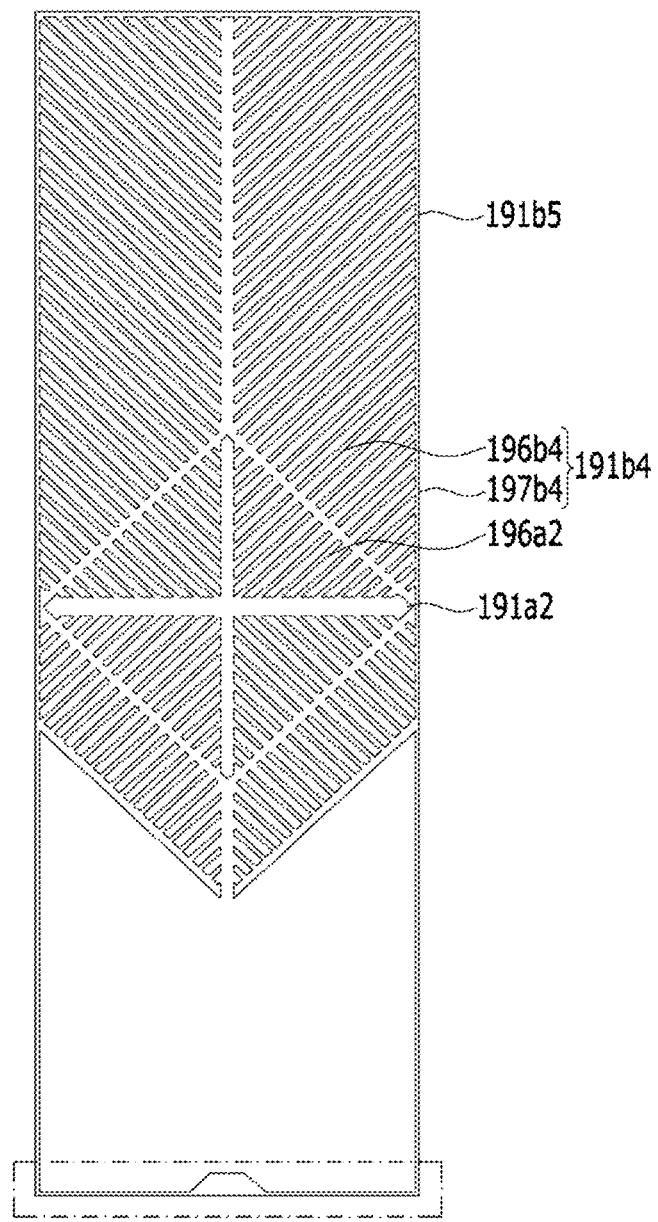
FIG. 4 is a layout view of the other part of the first subpixel electrode and the other part of the second subpixel electrode of the liquid crystal display of FIG. 1.
Figure 5:
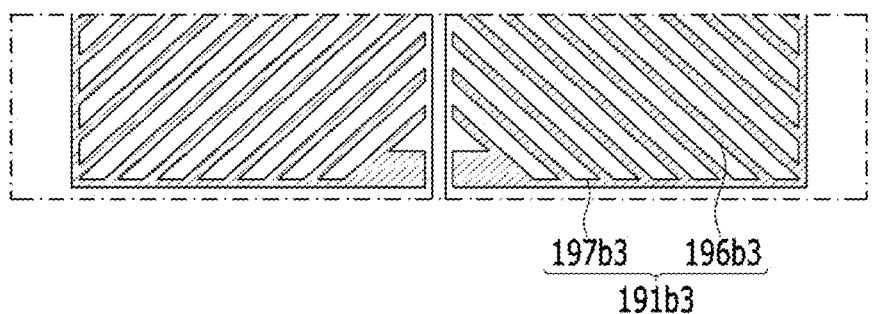
FIG. 5 is an enlarged layout view illustrating a partial region of FIG. 3.
Figure 6:
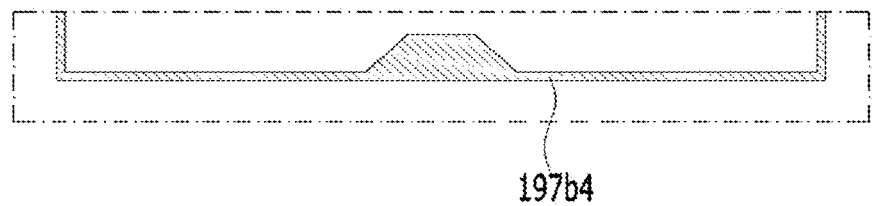
FIG. 6 is an enlarged layout view illustrating a partial region of FIG. 4.
Figure 7:
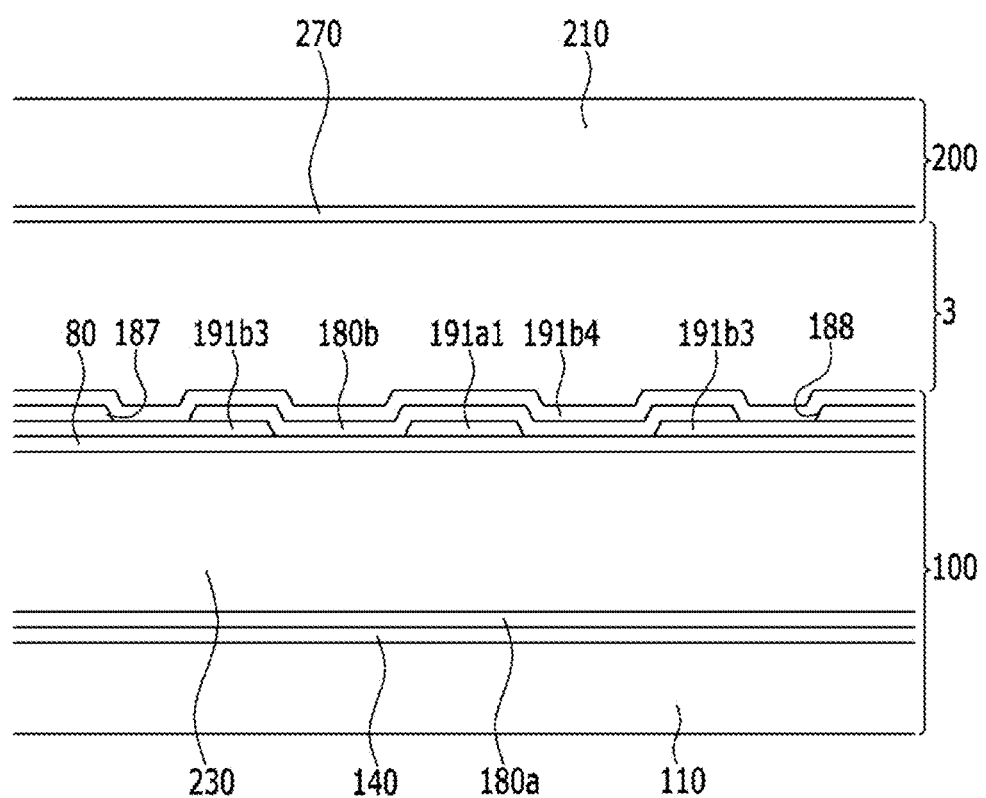
FIG. 7 is a cross-sectional view taken along line VII-VII of FIG. 1.
Figure 8:
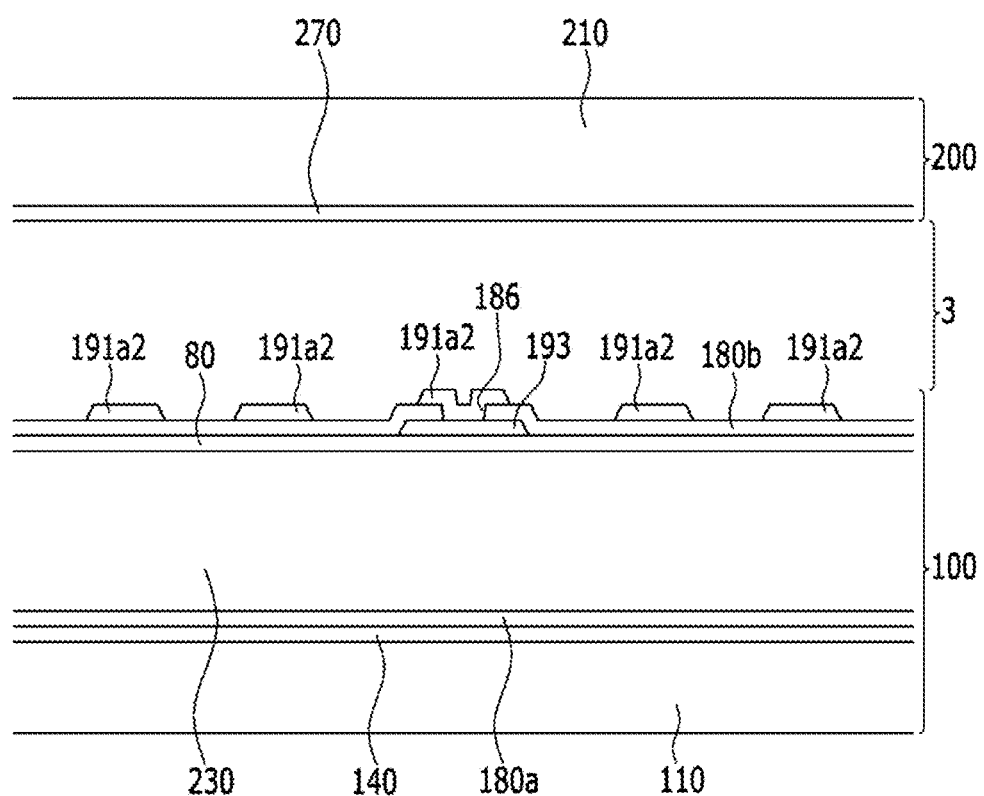
FIG. 8 is a cross-sectional view taken along line VIII-VIII of FIG. 1.
Figure 9:
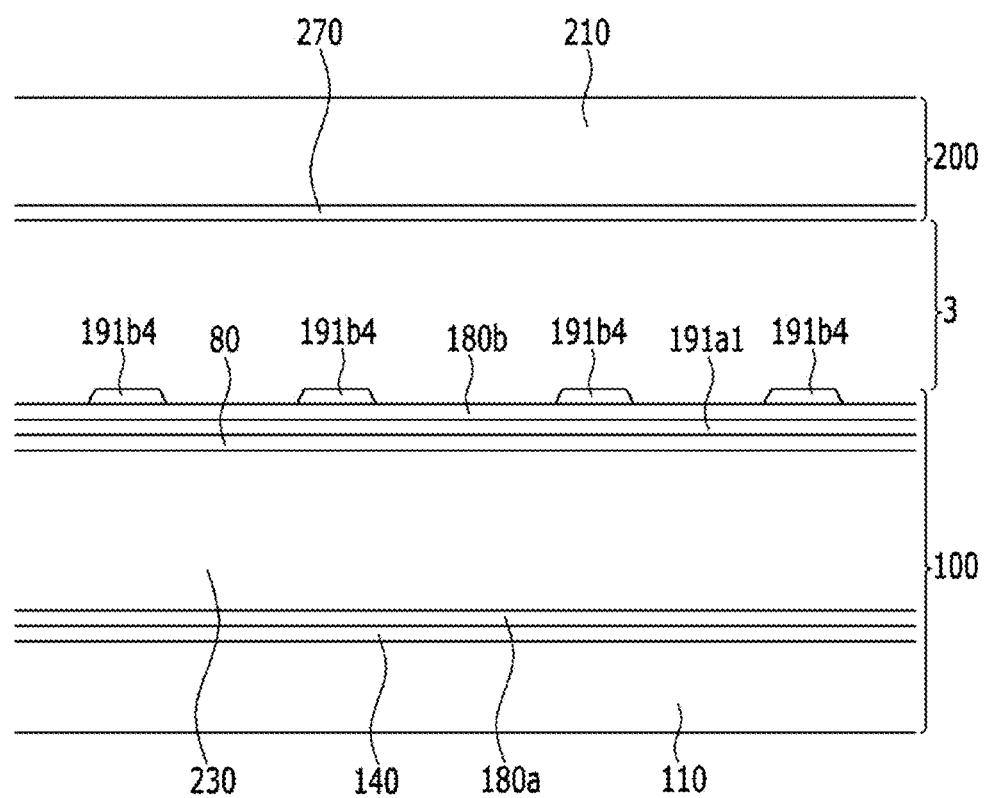
FIG. 9 is a cross-sectional view taken along line IX-IX of FIG. 1.
Figure 10:
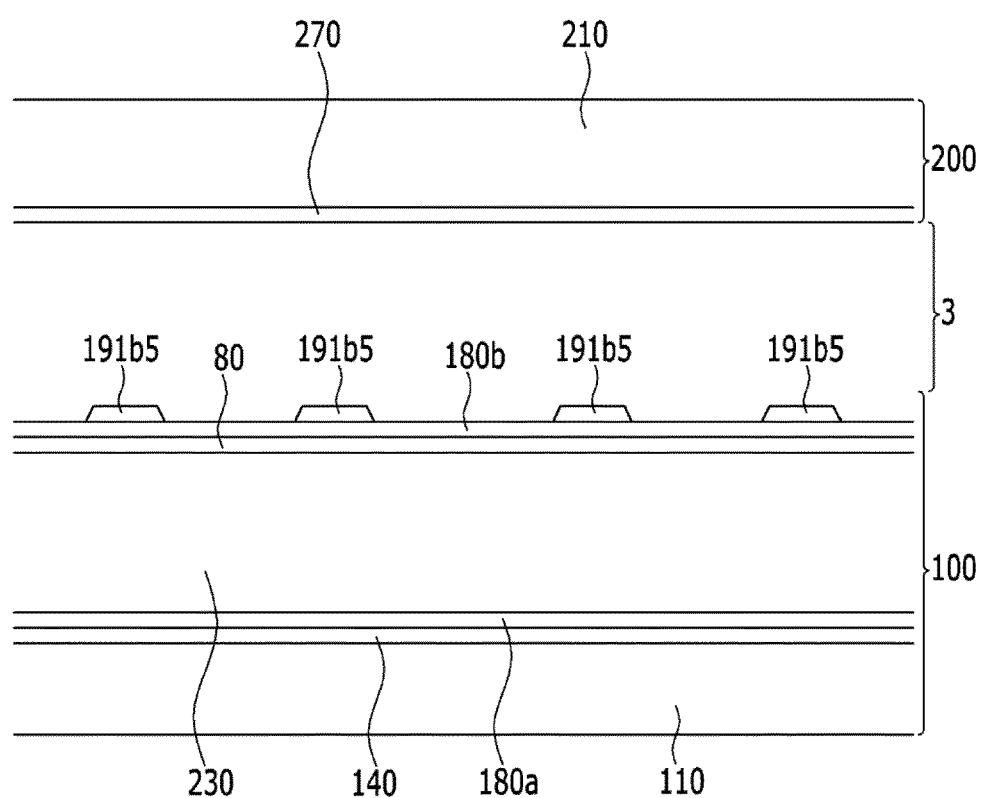
FIG. 10 is a cross-sectional view taken along line X-X of FIG. 1.
Figure 11:
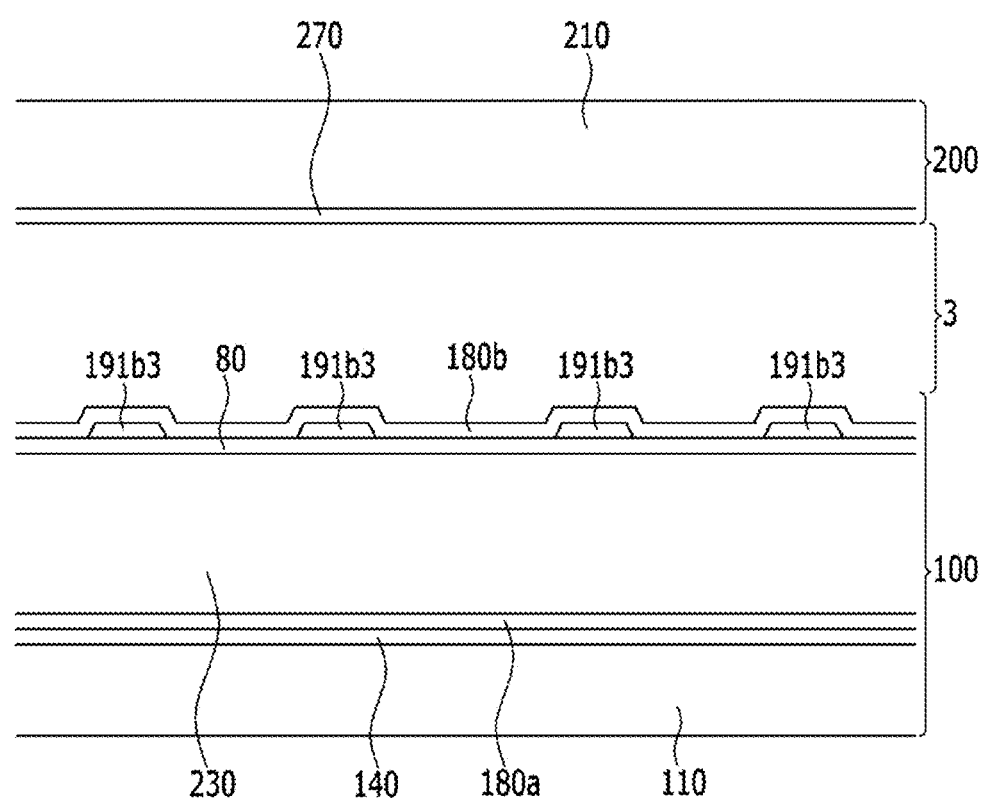
FIG. 11 is a cross-sectional view taken along line XI-XI of FIG. 1.

FIG. 1 is a layout view of a liquid crystal display according to an exemplary embodiment. FIG. 2 is a cross-sectional view of the liquid crystal display of FIG. 1 taken along line II-II. FIG. 3 is a layout view of a part of a first subpixel electrode and a part of a second subpixel electrode of the liquid crystal display of FIG. 1. FIG. 4 is a layout view of the other part of the first subpixel electrode and the other part of the second subpixel electrode of the liquid crystal display of FIG. 1. FIG. 5 is an enlarged layout view illustrating a partial region of FIG. 3. FIG. 6 is an enlarged layout view illustrating a partial region of FIG. 4. FIG. 7 is a cross-sectional view taken along line VII-VII of FIG. 1. FIG. 8 is a cross-sectional view taken along line VIII-VIII of FIG. 1. FIG. 9 is a cross-sectional view taken along line IX-IX of FIG. 1. FIG. 10 is a cross-sectional view taken along line X-X of FIG. 1. FIG. 11 is a cross-sectional view taken along line XI-XI of FIG. 1.

First, referring to FIGS. 1 and 2, a liquid crystal display according to the exemplary embodiment includes a lower panel 100 and an upper panel 200 facing each other, and a liquid crystal layer 3 interposed between the two panels 100 and 200.

First, the lower panel 100 will be described.

A gate line 121, a reference voltage line 131, and a storage electrode 135 are formed on an insulation substrate 110 made of transparent glass or plastic. The gate line 121 mainly extends in a horizontal direction and transfers a gate signal.

The gate line 121 includes a first gate electrode 124a, a second gate electrode 124b, a third gate electrode 124c, and a wide end portion (not illustrated) for connection with another layer or an external driving circuit.

The reference voltage line 131 may extend in parallel with the gate line 121 and has an extension 136, and the extension 136 is connected with a third drain electrode 175c to be described below.

The reference voltage line 131 includes the storage electrode 135 surrounding a pixel area.

A gate insulating layer 140 is formed on the gate line 121, the reference voltage line 131, and the storage electrode 135.

A first semiconductor 154a, a second semiconductor 154b, and a third semiconductor 154c, which may be made of amorphous or crystalline silicon, are formed on the gate insulating layer 140.

A plurality of ohmic contacts 163a, 163b, 163c, 165a, 165b, and 165c are formed on the first semiconductor 154a, the second semiconductor 154b, and the third semiconductor 154c. When the semiconductors 154a, 154b, and 154c are oxide semiconductors, the ohmic contacts 163a, 163b, 163c, 165a, 165b, and 165c may be omitted.

A data conductor 171, 173a, 173b 173c, 175a, 175b, and 175c including a data line 171 including a first source electrode 173a and a second source electrode 173b, a first drain electrode 175a, a second drain electrode 175b, a third source electrode 173c, and the third drain electrode 175c is formed on the ohmic contacts 163a, 163b, 163c, 165a, 165b, and 165c and the gate insulating layer 140.

The second drain electrode 175b is connected with the third source electrode 173c.

The first gate electrode 124a, the first source electrode 173a, and the first drain electrode 175a form a first thin film transistor Qa together with a first semiconductor 154a, and a channel of the first thin film transistor Qa is formed in the first semiconductor 154a between the first source electrode 173a and the first drain electrode 175a. Similarly, the second gate electrode 124b, the second source electrode 173b, and the second drain electrode 175b form a second thin film transistor Qb together with the second semiconductor 154b, and a channel of the second thin film transistor Qb is formed in the second semiconductor 154b between the second source electrode 173b and the second drain electrode 175b. Further, the third gate electrode 124c, the third source electrode 173c, and the third drain electrode 175c form a third thin film transistor Qc together with the third semiconductor 154c, and a channel of the third thin film transistor Qc is formed in the third semiconductor 154c between the third source electrode 173c and the third drain electrode 175c.

A first passivation layer 180a made of an inorganic insulating material such as silicon nitride or silicon oxide is formed on the data conductor 171, 173a, 173b, 173c, 175a, 175b, 175c and the exposed portions of the semiconductors 154a, 154b, and 154c.

A color filter 230 is positioned on the first passivation layer 180a.

A light blocking member (not illustrated) may be positioned on a region where the color filter 230 is not positioned. The light blocking member is called a black matrix and blocks light leakage.

A capping layer 80 is positioned on the color filter 230. The capping layer 80 may prevent the color filter 230 from being lifted and suppress the contamination of the liquid crystal layer 3 due to an organic material such as a solvent flowing in from the color filter 230, thereby preventing defects such as an afterimage which may be caused when a screen is driven.

A part of a first subpixel electrode 191a and a part of a second subpixel electrode 191b are formed on the capping layer 80. A second passivation layer 180b is formed on the capping layer 80, the part of a first subpixel electrode 191a, and the part of a second subpixel electrode 191b. The other part of the first subpixel electrode 191a and the other part of the second subpixel electrode 191b are formed on the second passivation layer 180b. The first subpixel electrode 191a and the second subpixel electrode 191b define a pixel electrode 191 and may be made of transparent metal oxide such as indium tin oxide (ITO) and indium zinc oxide (IZO).

In FIG. 3, a plane shape of the part of the first subpixel electrode 191a and the part of the second subpixel electrode 191b positioned below the second passivation layer 180b is illustrated, and in FIG. 4, a plane shape of the other part of the first subpixel electrode 191a and the other part of the second subpixel electrode 191b positioned on the second passivation layer 180b is illustrated.

The first subpixel electrode 191a includes a first subregion 191a1 and a second subregion 191a2, and the second subpixel electrode 191b includes as third subregion 191b3, a fourth subregion 191b4, and a fifth subregion 191b5.

As illustrated in FIG. 3, the first subregion 191a1 of the first subpixel electrode 191a, the third subregion 191b3 of the second subpixel electrode 191b, and a connection electrode 195 are positioned below the second passivation layer 180b.

The first subregion 191a1 of the first subpixel electrode 191a includes a rod-shaped connection portion positioned at the center of the pixel area and extending in a horizontal direction, and a planar portion positioned around the rod-shaped connection portion and surrounding the rod-shaped connection portion. An extension 193 is positioned around the center of the rod-shaped connection portion. Further, a protrusion, e.g., vertical rod shaped portions, extending upward and downward from the planar portion is positioned. The planar portion has a plane shape in which four parallelograms are connected to each other. Planar means in a planar shape which is not split as a whole plate. As such, the first subregion 191a1 of the first subpixel electrode 191a is positioned at a part of the pixel area.

The third subregion 191b3 of the second subpixel electrode 191b is positioned below the planar portion of the first subregion 191a1 of the first subpixel electrode 191a on a plan view and includes a plurality of first branch electrodes 196b3. The first branch electrodes 196b3 extend in two directions. Further, the third subregion 191b3 of the second subpixel electrode 191b further includes a first outer electrode 197b3 connecting edges of the first branch electrodes 196b3.

The first subregion 191a1 of the first subpixel electrode 191a and the third subregion 191b3 of the second subpixel electrode 191b are formed on the same layer and are electrically separated from each other.

The connection electrode 195 is electrically separated from the first subpixel electrode 191a and the second subpixel electrode 191b. The connection electrode 195 overlaps with the extension 136 of the reference voltage line 131 and overlaps with the third drain electrode 175c.

As illustrated in FIG. 4, the second subregion 191a2 of the first subpixel electrode 191a, the fourth subregion 191b4 and the fifth subregion 191b5 of the second subpixel electrode 191b are positioned on the second passivation layer 180b.

The second subregion 191a2 of the first subpixel electrode 191a is positioned at the center of the pixel and an overall shape thereof is a rhombus. The second subregion 191a2 of the first subpixel electrode 191a includes a cross stem having a horizontal portion and a vertical portion and a plurality of second branch electrodes 196a2 extending from the cross stem. The second branch electrodes 196a2 extend in four directions.

The fourth subregion 191b4 and the fifth subregion 191b5 of the second subpixel electrode 191b include a plurality of third branch electrodes 196b4 positioned on the same extension line as the first branch electrodes 196b3. The third branch electrodes 196b4 extend in four directions. The second branch electrodes 196a2 of the second subregion 191a2 of the first subpixel electrode 191a and the third branch electrodes 196b4 of the fourth subregion 191b4 and the fifth subregion 191b5 of the second subpixel electrode 191b are spaced apart from each other at predetermined intervals. The fourth subregion 191b4 and the fifth subregion 191b5 of the second subpixel electrode 191b further include a second outer electrode 197b4 connecting edges of the third branch electrodes 196b4.

The fourth subregion 191b4 of the second subpixel electrode 191b overlaps with the first subregion 191a1 of the first subpixel electrode 191a. Particularly, the fourth subregion 191b4 of the second subpixel electrode 191b overlaps with the planar portion of the first subregion 191a1 of the first subpixel electrode 191a. An insulating layer, particularly, the second passivation layer 180b is positioned between the fourth subregion 191b4 of the second subpixel electrode 191b and the first subregion 191a1 of the first subpixel electrode 191a.

The fourth subregion 191b4 of the second subpixel electrode 191b is positioned at the center of the pixel area. The third branch electrodes 196b4 positioned at the fourth subregion 191b4 of the second subpixel electrode 191b extend in four directions.

The fifth subregion 191b5 of the second subpixel electrode 191b does not overlap with the first subregion 191a1 of the first subpixel electrode 191a. The fifth subregion 191b5 of the second subpixel electrode 191b is positioned above the fourth subregion 191b4 of the second subpixel electrode 191b on a plan view. The third branch electrodes 196b4 positioned at the fifth subregion 191b5 extend in two directions. The fifth subregion 191b5 of the second subpixel electrode 191b is disposed on the same extension line as the fourth subregion 191b4 of the second subpixel electrode 191b. A boundary between the fifth subregion 191b5 and the fourth subregion 191b4 of the second subpixel electrode 191b corresponds to a boundary between a second region R2 and a third region R3.

The second subregion 191a2 of the first subpixel electrode 191a and the fourth subregion 191b4 and the fifth subregion 191b5 of the second subpixel electrode 191b are formed on the same layer. The second subregion 191a2 of the first subpixel electrode 191a is electrically separated from the fourth subregion 191b4 and the fifth subregion 191b5 of the second subpixel electrode 191b. The fourth subregion 191b4 and the fifth subregion 191b5 of the second subpixel electrode 191b are electrically connected to each other.

In the first passivation layer 180a and the capping layer 80, a first contact hole 185a extending to and exposing a part of the first drain electrode 175a is formed, a second contact hole 185b extending to and exposing a part of the second drain electrode 175b is formed, and a third contact hole 185c extending to and exposing the extension 136 of the reference voltage line 131 and a part of the third drain electrode 175c is formed.

The first subregion 191a1 of the first subpixel electrode 191a is physically and electrically connected to the first drain electrode 175a through the first contact hole 185a. The first subregion 191a1 of the first subpixel electrode 191a receives a first voltage through the first drain electrode 175a. The third subregion 191b3 of the second subpixel electrode 191b is physically and electrically connected to the second drain electrode 175b through the second contact hole 185b. The third subregion 191b3 of the second subpixel electrode 191b receives a second voltage through the second drain electrode 175b. In this case, the first subpixel electrode 191a and the second subpixel electrode 191b receive different data voltages.

The connection electrode 195 is physically and electrically connected to the extension 136 of the reference voltage line 131 through the third contact hole 185c, and physically and electrically connected to the third drain electrode 175c. Accordingly, the third drain electrode 175c is physically and electrically connected to the reference voltage line 131.

A fourth contact hole 186 extending to and exposing an extension 193 of the exposing an first subregion 191a1 of the first subpixel electrode 191a is formed in the second passivation layer 180b.

The second subregion 191a2 of the first subpixel electrode 191a is connected to the extension 193 of the first subregion 191a1 of the first subpixel electrode 191a through the fourth contact hole 186. The second subregion 191a2 of the first subpixel electrode 191a receives the first voltage through the first subregion 191a1 of the first subpixel electrode 191a.

Referring to FIGS. 5 to 7, a partial region of the first outer electrode 197b3 of the third subregion 191b3 of the second subpixel electrode 191b has a larger width than other portions. Particularly, portions of the first outer electrode 197b3 positioned at both sides with the first subregion 191a1 of the first subpixel electrode 191a therebetween have larger widths than other portions.

The second outer electrode 197b4 of the fourth subregion 191b4 of the second subpixel electrode 191b connects the third branch electrode 196b4 and is extended to overlap with the first outer electrode 197b3.

The third subregion 191b3 of the second subpixel electrode 191b and the fourth subregion 191b4 of the second subpixel electrode 191b partially overlap with each other with the insulating layer, particularly, the second passivation layer 180b therebetween. Particularly, the first outer electrode 197b3 of the third subregion 191b3 of the second subpixel electrode 191b and the second outer electrode 197b4 of the fourth subregion 191b4 of the second subpixel electrode 191b partially overlap with each other with the second passivation layer 180b therebetween.

A fifth contact hole 187 and a sixth contact hole 188 extending to and exposing a part of the third subregion 191b3 of the second subpixel electrode 191b are formed in the second passivation layer 180b. The fifth contact hole 187 and the sixth contact hole 188 are formed to expose the portion of the first outer electrode 197b3 having a larger width than other portions. The fifth contact hole 187 and the sixth contact hole 188 are positioned at both sides with the first subregion 191a1 of the first subpixel electrode 191a therebetween on a plan view. The fourth subregion 191b4 of the second subpixel electrode 191b is physically and electrically connected to the third subregion 191b3 of the second subpixel electrode 191b through the fifth contact hole 187 and the sixth contact hole 188. The fourth subregion 191b4 of the second subpixel electrode 191b receives a second voltage through the third subregion 191b3 of the second subpixel electrode 191b.

Next, the upper panel 200 will be described.

A light blocking member 220 and a common electrode 270 are formed on an insulation substrate 210 made of transparent glass or plastic.

However, in the case of a liquid crystal display according to another exemplary embodiment, the light blocking member 220 may be positioned on the lower panel 100, and in the case of the liquid crystal display according to another exemplary embodiment, a color filter may be positioned on the upper panel 200.

Alignment layers (not illustrated) are formed on inner surfaces of the display panels 100 and 200, and may be vertical alignment layers.

Polarizers (not illustrated) are provided on outer surfaces of the two panels 100 and 200, and transmissive axes of the two polarizers are orthogonal to each other, and one transmissive axis thereof may be parallel to the gate line 121. However, the polarizer may be disposed only on the outer side of any one of the two panels 100 and 200.

The liquid crystal layer 3 has negative dielectric anisotropy, and the liquid crystal molecules of the liquid crystal layer 3 are aligned so that long axes thereof are vertical to the surfaces of the two panels 100 and 200 while the electric field is not applied. Accordingly, incident light does not pass through an orthogonal polarizer, but is blocked while the electric field is not applied.

At least one of the liquid crystal layer 3 and the alignment layer may include a photo-reactive material, in more detail, reactive mesogen.

Next, a driving method of the liquid crystal display according to the exemplary embodiment will be briefly described.

When a gate-on signal is applied to the gate line 121, the gate-on signal is applied to the first gate electrode 124a, the second gate electrode 124b, and the third gate electrode 124c, and as a result, the first switching element Qa, the second switching element Qb, and the third switching element Qc are turned on. Accordingly, the data voltages applied to the data line 171 are applied to the first subpixel electrode 191a and the second subpixel electrode 191b through the turned-on first switching element Qa and second switching element Qb, respectively. In this case, the voltages having the same magnitude are applied to the first subpixel electrode 191a and the second subpixel electrode 191b. However, the voltage applied to the second subpixel electrode 191b is divided through the third switching element Qc which is connected with the second switching element Qb in series. Accordingly, the voltage applied to the second subpixel electrode 191b is smaller than the voltage applied to the first subpixel electrode 191a.

Referring back to FIGS. 1, 3, and 4, one pixel area of the liquid crystal display according to the exemplary embodiment is configured by a first region R1 in which the second subregion 191a2 of the first subpixel electrode 191a is positioned, the second region R2 in which the first subregion 191a1 of the first subpixel electrode 191a and the fourth subregion 191b4 of the second subpixel electrode 191b overlap with each other the third region R3 in which the fifth subregion 191b5 of the second subpixel electrode 191b is positioned, and a fourth region R4 in which the third subregion 191b3 of the second subpixel electrode 191b is positioned.

The first region R1 and the second region R2 are divided into four portions in directions of the branch electrodes, and the third region R3 and the fourth region R4 are divided into two portions in directions of the branch electrodes.

Next, the first region R1, the second region R2, the third region R3, and the fourth region R4 included in one pixel area of the liquid crystal display of the exemplary embodiment will be described with reference to FIGS. 8 to 11.

Referring to FIG. 8, in the first region R1 of one pixel area of the liquid crystal display of the exemplary embodiment, an electric field is generated between the second subregion 191a2 of the first subpixel electrode 191a positioned on the lower panel 100 and the common electrode 270 positioned on the upper panel 200. The second subregion 191a2 of the first subpixel electrode 191a is connected to the extension 193 of the first subregion 191a1 of the first subpixel electrode 191a to receive the first voltage and a common voltage is applied to the common electrode 270. In this case, the second subregion 191a2 of the first subpixel electrode 191a includes a cross stem and a plurality of second branch electrodes 196a2 extending in four different directions. The plurality of second branch electrodes 196a2 may be tilted at about 40° to about 45° based on the gate line 121. By a fringe field generated by the edges of the plurality of second branch electrodes 196a2, liquid crystal molecules of the liquid crystal layer 3 positioned in the first region R1 are reclined in four different directions. In more detail, since a horizontal component of the fringe field by the plurality of second branch electrodes 196a2 is substantially horizontal to the side of the plurality of second branch electrodes 196a2, the liquid crystal molecules are tilted in a parallel direction to the length direction of the plurality of second branch electrodes 196a2.

Referring to FIG. 9, in the second region R2 of one pixel area of the liquid crystal display of the exemplary embodiment, the fourth subregion 191b4 of the second subpixel electrode 191b and the first subregion 191a1 of the first subpixel electrode 191a overlap with each other. The liquid crystal molecules of the liquid crystal layer 3 are aligned by electric fields in addition to the electric field generated between the fourth subregion 191b4 of the second subpixel electrode 191b positioned on the lower panel and the common electrode 270 positioned on the upper panel 200. More particularly, by an electric field generated between the first subregion 191a1 of the first subpixel electrode 191a positioned between the plurality of third branch electrodes 196b4 of the fourth subregion 191b4 of the second subpixel electrode 191b and the common electrode 270, and an electric field generated between the fourth subregion 191b4 of the second subpixel electrode 191b and the first subregion 191a1 of the first subpixel electrode 191a, the liquid crystal molecules of the liquid crystal layer 3 are additionally aligned. The fourth subregion 191b4 of the second subpixel electrode 191b is connected to the third subregion 191b3 of the second subpixel electrode 191b to receive the second voltage. In this case, the fourth subregion 191b4 of the second subpixel electrode 191b includes the plurality of third branch electrodes 196b4 extending in four different directions. The plurality of third branch electrodes 196b4 may be tilted at about 40° to about 45° based on the gate line 121. By a fringe field generated by the edges of the plurality of third branch electrodes 196b4, liquid crystal molecules of the liquid crystal layer 3 positioned in the second region R2 are reclined in four different directions. In detail, the liquid crystal molecules are tilted in a parallel direction to the length direction of the plurality of third branch electrodes 196b4.

Referring to FIG. 10, in the third region R3 of one pixel area of the liquid crystal display of the exemplary embodiment, an electric field is generated between the fifth subregion 191b5 of the second subpixel electrode 191b positioned on the lower panel 100 and the common electrode 270 positioned on the upper panel 200. The fifth subregion 191b5 of the second subpixel electrode 191b is connected to the fourth subregion 191b4 of the second subpixel electrode 191b to receive the second voltage. The fifth subregion 191b5 of the second subpixel electrode 191b includes a plurality of third branch electrodes 196b4 extending in two different directions. The third branch electrodes 196b4 in two directions among the third branch electrodes 196*b*4 in the four directions positioned in the fourth subregion 191*b*4 of the second subpixel electrode 191*b* are extended up to the fifth subregion 191*b*5 of the second subpixel electrode 191*b*.

Referring to FIG. 11, in the fourth region R4 of one pixel area of the liquid crystal display of the exemplary embodiment, an electric field is generated between the third subregion 191*b*3 of the second subpixel electrode 191*b* positioned on the lower panel 100 and the common electrode 270 positioned on the upper panel 200. The second voltage is applied to the third subregion 191*b*3 of the second subpixel electrode 191*b*. The third subregion 191*b*3 of the second subpixel electrode 191*b* includes a plurality of first branch electrodes 196*b*3 extending in two different directions. The first branch electrode 196*b*3 extends in the same direction as the directions of some of the third branch electrodes 196*b*4 positioned in the fourth subregion 191*b*4 of the second subpixel electrode 191*b* and extends in a different direction to the directions of the third branch electrodes 196*b*4 positioned in the fifth subregion 191*b*5 of the second electrode 191*b*. By a fringe field generated by the edges of the plurality of first branch electrodes 196*b*3, liquid crystal molecules of the liquid crystal layer 3 positioned in the fourth region R4 are reclined in two different directions. In detail, the liquid crystal molecules are tilted in a parallel direction to the length direction of the plurality of first branch electrodes 196*b*3.

As described above, the magnitude of the second voltage applied to the second subpixel electrode 191*b* is smaller than the magnitude of the first voltage applied to the first subpixel electrode 191*a*.

In the exemplary embodiment, the intensity of the electric field applied to the liquid crystal layer 3 positioned in the first region R1 is largest, and the intensity of the electric field applied to the liquid crystal layer 3 positioned in the second region R2 is smaller than the intensity of the electric field applied to the liquid crystal layer 3 positioned in the first region R1. The intensity of the electric field applied to the liquid crystal layer 3 positioned in the third region R3 is smaller than the intensity of the electric field applied to the liquid crystal layer 3 positioned in the second region R2 and smaller than the intensity of the electric field applied to the liquid crystal layer 3 positioned in the fourth region R4.

In the second region R2, since an influence by the electric field of the first subpixel electrode 191*a* positioned below the second subpixel electrode 191*b* exists, the intensity of the electric field applied to the liquid crystal layer 3 positioned in the second region R2 is smaller than the intensity of the electric field applied to the liquid crystal layer 3 positioned in the first region R1 and larger than the intensity of the electric field applied to the liquid crystal layer 3 positioned in the third region R3.

In the fourth region R4, since an insulation layer is further interposed between the two electrodes generating the electric fields as compared with the third region R3, the intensity of the electric field in the fourth region R4 is smaller than the intensity of the electric field applied to the liquid crystal layer 3 positioned in the third region R3. In the third region R3, the fifth subregion 191*b*5 of the second subpixel electrode 191*b* is formed on the second passivation layer 180*b*, and in the fourth region R4, the third subregion 191*b*3 of the second subpixel electrode 191*b* is formed below the second passivation layer 180*b*. Even though the same second voltage is applied to the fifth subregion 191*b*5 and the third subregion 191*b*3 of the second subpixel electrode 191*b*, the intensity of the electric field applied to the liquid crystal layer 3 is relatively decreased in the fourth region R4 due to the influence by the second passivation layer 180*b*.

As such, in the liquid crystal display according to the exemplary embodiment, one pixel area is divided into the first region R1 in which the first subpixel electrode 191*a* to which the relatively high first voltage is applied is positioned, the second region R2 in which a part of the first subpixel electrode 191*a* and a part of the second subpixel electrode 191*b* to which the relatively low second voltage is applied overlap with each other with the insulating layer therebetween, the third region R3 in which the second subpixel electrode 191*b* to which the relatively low second voltage is applied is positioned, and the fourth region R4 in which the second subpixel electrode 191*b* is covered by the insulating layer. The intensities of the electric fields applied to the liquid crystal molecules corresponding to the first region R1, the second region R2, the third region R3, and the fourth region R4 are different from each other, the tilted angles of the liquid crystal molecules are different from each other, and as a result, luminance of each region varies. As such, one pixel area is divided into four regions having different luminance to gradually control a change in transmittance according to a gray and thus the transmittance according to a gray change even in the low gray and the high gray is prevented from being rapidly changed at the side, and as a result, even while the side visibility is approximated to the front visibility, accurate grays can be expressed even in the low gray and the high gray.

Hereinafter, an appearance of actually manufacturing the liquid crystal display according to the exemplary embodiment will be described with reference to FIG. 12.

Figure 12:
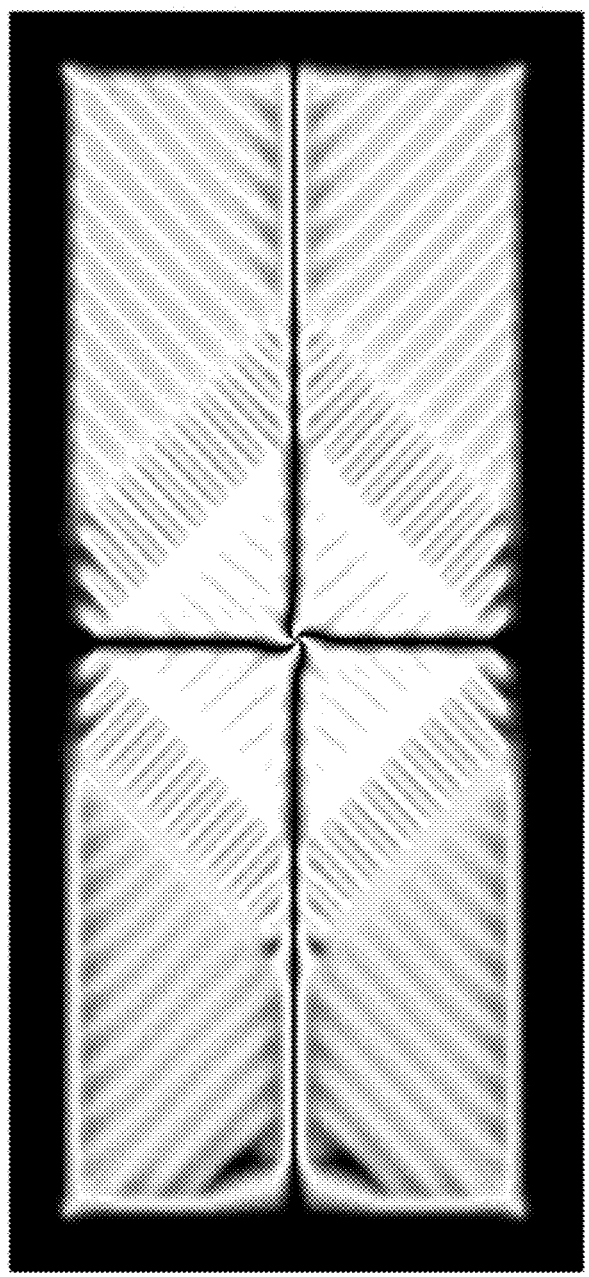
FIG. 12 is a plane photograph of the liquid crystal display according to the exemplary embodiment.

FIG. 12 is a plane photograph of the liquid crystal display according to the exemplary embodiment.

As illustrated in FIG. 12, the portion positioned at the most central part is the first region in which the largest electric field is generated and has the highest luminance. The second region surrounding the first region has luminance which is relatively lower than the first region. The third region and the fourth region positioned at the outside of the second region have luminance which is lower than the second region. When comparing the third region positioned above the second region with the fourth region positioned below the second region, it can be seen that the fourth region has luminance which is lower than that of the third region. As such, one pixel is configured by four regions having different transmittance and as a result, the side visibility may be controlled to be approximated to the front visibility.

Hereinafter, side visibility of the liquid crystal display according to the exemplary embodiment will be described with reference to FIG. 13.

Figure 13:
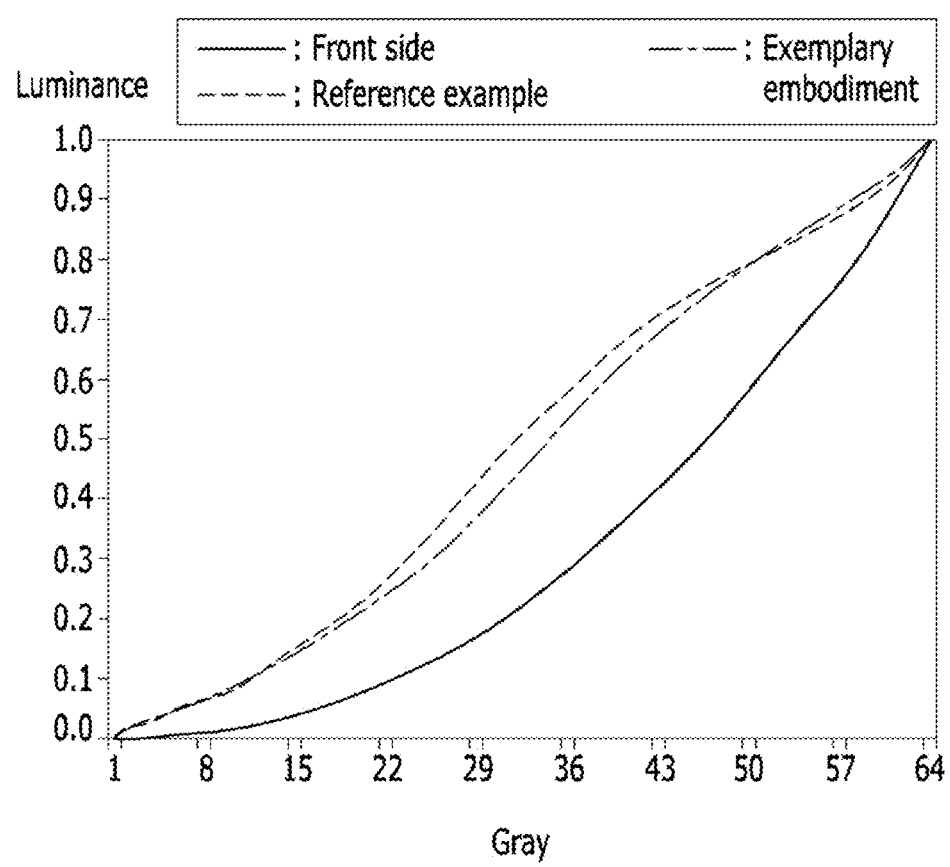
FIG. 13 is a graph illustrating luminance according to a gray of the liquid crystal display according to the exemplary embodiment.

FIG. 13 is a graph illustrating luminance according to a gray of the liquid crystal display according to the exemplary embodiment. In FIG. 13, luminance (front side) according to a gray when viewing the liquid crystal display from the front side and luminance (exemplary embodiment) according to a gray when viewing the liquid crystal display at the side are illustrated. In this case, luminance (reference example) according to a gray when viewing a liquid crystal display according to a reference example configured by a different structure from the exemplary embodiment from the side is illustrated together. As a graph at the side is close to a graph at the front side, the side visibility is high.

In the liquid crystal display according to the exemplary embodiment, one pixel is configured by four regions having different luminance. The four regions are configured by a first region, a second region having lower luminance than first region, a third region having lower luminance than the second region, and a fourth region having lower luminance than the third region. In this case, an area ratio of the first region, the second region, the third region, and the fourth region may be 1:2:3:3. Further, a voltage ratio of the first region, the second region, the third region, and the fourth region may be 1:0.8:0.65:0.59.

In the liquid crystal display according to the reference example, one pixel is configured by three regions having different luminance. The three regions are configured by a first region, a second region having lower luminance than the first region, and a third region having lower luminance than the second region. In this case, an area ratio of the first region, the second region, and the third region may be 1:2:6. Further, a voltage ratio of the first region, the second region, and the third region may be 1:0.8:0.65.

It can be seen that a graph of a change in side luminance of the liquid crystal display according to the exemplary embodiment is closer to a graph of a change in front luminance than a graph of a change in side luminance of the liquid crystal display according to the reference example. Accordingly, in the liquid crystal display according to the exemplary embodiment, it can be seen that one pixel is configured by four regions having different luminance, and as a result the side visibility may be improved.

Further, when describing the graph of the change in side luminance of the liquid crystal display according to the exemplary embodiment, it can be seen that a period in which a variation rate of luminance according to a change in grays is rapidly changed is decreased as compared with the reference example. As a result, accurate grays can be expressed and image quality may be improved.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of symbols>

| | |
|---|---|
| 100: Lower panel | 110, 210: Insulation substrate |
| 121: Gate line | 131: Reference voltage line |
| 135: Storage electrode | 136: Extension of reference voltage line |
| 171: Data line | 180a: First passivation layer |
| 180b: Second passivation layer | 191a: First subpixel electrode |
| 191a1: First subregion of first subpixel electrode | |
| 191a2: Second subregion of first subpixel electrode | |
| 191b: Second subpixel electrode | |
| 191b3: Third subregion of second subpixel electrode | |
| 191b4: Fourth subregion of second subpixel electrode | |
| 191b5: Fifth subregion of second subpixel electrode | |
| 196b3: First branch electrode | 196a2: Second branch electrode |
| 196b4: Third branch electrode | 197b3: First outer electrode |
| 197b4: Second outer electrode | 200: Upper panel |
| 270: Common electrode | |

What is claimed is:

1. A liquid crystal display, comprising:
a first substrate;
a first subpixel electrode which is positioned on the first substrate, to which a first voltage is configured to be applied, and which includes a first subregion and a second subregion;
a second subpixel electrode which is positioned on the first substrate, to which a second voltage is configured to be applied, and which includes a third subregion, a fourth subregion, and a fifth subregion;
an insulating layer which is positioned on the first subregion of the first subpixel electrode and the third subregion of the second subpixel electrode and positioned below the second subregion of the first subpixel electrode and the fourth subregion and the fifth subregion of the second subpixel electrode;
a second substrate facing the first substrate;
a common electrode which is positioned on the second substrate and to which a common voltage is configured to be applied; and
a liquid crystal layer positioned between the first substrate and the second substrate,
wherein the first subregion of the first subpixel electrode and the fourth subregion of the second subpixel electrode overlap with each other.

2. The liquid crystal display of claim 1, wherein:
a difference between the first voltage and the common voltage is larger than a difference between the second voltage and the common voltage.

3. The liquid crystal display of claim 2, further comprising:
a plurality of pixels,
wherein the pixels include:
a first region in which the second subregion of the first subpixel electrode is positioned,
a second region in which the first subregion of the first subpixel electrode and the fourth subregion of the second subpixel electrode overlap with each other,
a third region in which the fifth subregion of the second subpixel electrode is positioned, and
a fourth region in which the third subregion of the second subpixel electrode is positioned.

4. The liquid crystal display of claim 3, wherein:
luminance of the first region, the second region, the third region, and the fourth region is different.

5. The liquid crystal display of claim 4, wherein:
the luminance of the second region is lower than the luminance of the first region,
the luminance of the third region is lower than the luminance of the second region, and
the luminance of the fourth region is lower than the luminance of the third region.

6. The liquid crystal display of claim 1, wherein:
a first contact hole extending to at least a part of the first subregion of the first subpixel electrode is formed in the insulating layer, and
the second subregion of the first subpixel electrode is connected with the first subregion of the first subpixel electrode through the first contact hole.

7. The liquid crystal display of claim 1, wherein:
a second contact hole extending to at least a part of the third subregion of the second subpixel electrode is formed in the insulating layer, and
the fourth subregion of the second subpixel electrode is connected with the third subregion of the first subpixel electrode through the second contact hole.

8. The liquid crystal display of claim 1, wherein:
the third subregion of the second subpixel electrode includes a plurality of first branch electrodes extending in two different directions and a first outer electrode connecting edges of the plurality of first branch electrodes.

9. The liquid crystal display of claim 8, wherein:
the second subregion of the first subpixel electrode includes a cross stem and a plurality of second branch electrodes extending from the cross stem in four different directions.

10. The liquid crystal display of claim 9, wherein:
the fourth subregion of the second subpixel electrode includes a plurality of third branch electrodes extending in two different directions and a second outer electrode connecting edges of the plurality of third branch electrodes.

11. The liquid crystal display of claim 10, wherein:
some of the third branch electrodes are extended in the fifth subregion of the second subpixel electrode.

12. The liquid crystal display of claim 10, wherein:
the second outer electrode of the fourth subregion of the second subpixel electrode is extended to overlap with the first outer electrode.

13. The liquid crystal display of claim 12, wherein:
the second outer electrode and the first outer electrode are connected to each other.

14. The liquid crystal display of claim 1, wherein:
the first subregion of the first subpixel electrode has a planar shape.

15. The liquid crystal display of claim 1, wherein:
the first subregion of the first subpixel electrode and the fourth subregion of the second subpixel electrode are positioned to surround the second subregion of the first subpixel electrode, and the third and fifth subregions of the second subpixel electrode are positioned to surround the fourth subregion of the second subpixel electrode.

16. The liquid crystal display of claim 1, wherein:
the first subpixel electrode and the second subpixel electrode are physically and electrically separated from each other.

17. The liquid crystal display of claim 16, wherein:
the first subregion of the first subpixel electrode is positioned on the same layer as the third subregion of the second subpixel electrode and physically and electrically separated from the third subregion of the second subpixel electrode.

18. The liquid crystal display of claim 16, wherein:
the second subregion of the first subpixel electrode is positioned on the same layer as the fourth subregion and the fifth subregion of the second subpixel electrode and physically and electrically separated from the fourth subregion and the fifth subregion of the second subpixel electrode.

19. The liquid crystal display of claim 1, further comprising:
a plurality of pixels,
wherein the pixels include:
a first region in which the second subregion of the first subpixel electrode is positioned,
a second region in which the first subregion of the first subpixel electrode and the fourth subregion of the second subpixel electrode overlap with each other,
a third region in which the fifth subregion of the second subpixel electrode is positioned, and
a fourth region in which the third subregion of be second subpixel electrode is positioned.

20. The liquid crystal display of claim 19, wherein:
the luminance of the second region is lower than the luminance of the first region,
the luminance of the third region is lower than the luminance of the second region, and
the luminance of the fourth region is lower than the luminance of the third region.

* * * * *